US00RE47577E

(19) United States
(12) Reissued Patent
Lee et al.

(10) Patent Number: US RE47,577 E
(45) Date of Reissued Patent: Aug. 20, 2019

(54) METHOD FOR PROVIDING WIDGETS AND TV USING THE SAME

(71) Applicant: SAMSUNG ELECTRONICS CO., LTD., Suwon-si (KR)

(72) Inventors: Sang-hee Lee, Seoul (KR); Yong-hwan Kwon, Seongnam-si (KR); Dong-heon Lee, Seoul (KR); Mi-ju Park, Daejeon (KR); Won-il Kim, Gwacheon-si (KR); Yeo-ri Yoon, Suwon-si (KR)

(73) Assignee: SAMSUNG ELECTRONICS CO., LTD., Suwon-si (KR)

(21) Appl. No.: 14/691,292

(22) Filed: Apr. 20, 2015

Related U.S. Patent Documents

Reissue of:
(64) Patent No.: 8,589,981
Issued: Nov. 19, 2013
Appl. No.: 12/396,507
Filed: Mar. 3, 2009

(30) Foreign Application Priority Data

Jul. 10, 2008 (KR) ..... 10-2008-0066994

(51) Int. Cl.
*G06F 16/951* (2019.01)

(52) U.S. Cl.
CPC ..... *G06F 16/951* (2019.01)

(58) Field of Classification Search
CPC ..... G05F 17/30864; G06F 16/951
USPC ..... 725/53, 61
See application file for complete search history.

(56) References Cited

U.S. PATENT DOCUMENTS 5,485,197 A * 1/1996 Hoarty ..... G06F 3/04815 345/649
5,793,438 A * 8/1998 Bedard ..... H04N 5/44543 348/561
7,703,116 B1 * 4/2010 Moreau ..... G06F 3/0482 725/44
2008/0109109 A1 * 5/2008 Schanin et al. ..... 700/231
2009/0171754 A1 * 7/2009 Kane et al. ..... 705/10
2009/0172551 A1 * 7/2009 Kane et al. ..... 715/733
2009/0172746 A1 * 7/2009 Aldrey et al. ..... 725/61

OTHER PUBLICATIONS

Communication dated May 19, 2016 issued by the European Patent Office in counterpart European Patent Application No. 09155245.5.
Communication dated Nov. 22, 2016, issued by the European Patent Office in counterpart European Application No. 09155245.5.
Sharon Cohen-Hager "New Interactive Weather and Traffic Feature the First of Several New FiOS TV Services" Jun. 1, 2006, pp. 1-2.

* cited by examiner

*Primary Examiner* — Mark Sager
(74) *Attorney, Agent, or Firm* — Sughrue Mion, PLLC

(57) ABSTRACT

A method for providing widgets and a TV using the same are disclosed. The method for providing widgets includes searching for widgets related to a certain keyword or a broadcast program among widgets provided by a plurality of content providers, and displaying the searched widgets on a widget search list classified according to content provider. A user can thereby search for and use the widgets provided from various content providers more easily.

57 Claims, 7 Drawing Sheets

METHOD FOR PROVIDING WIDGETS AND TV USING THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [application] *is a reissue application of U.S. patent application Ser. No. 12/396,507, filed on Mar. 3, 2009, which* claims priority from Korean Patent Application No. 10-2008-66994, filed on Jul. 10, 2008, in the Korean Intellectual Property Office, the disclosure of which is incorporated herein by reference in its entirety.

BACKGROUND

1. Field

Apparatuses and methods consistent with the present invention relate to providing a method for providing widgets and a TV using the same, and more particularly, to providing a method for providing widgets in which a user receives widgets from various service providers, and a TV using the same.

2. Description of the Related Art

Recently, televisions (TVs) not only display broadcasting programs on a screen but also receive diverse information through data broadcasting and the Internet, and display the information on the screen. In particular, as a TV is connected to the Internet, a user can receive more diverse content than in the past.

A TV connected to the Internet may receive information on news, weather or the like from content providers and displays it in widget forms. As information such as news, weather, or the like is continuously displayed in the form of widgets, the user can check the latest information on news, weather, or the like with ease.

As the TV is connected to the Internet, the user can receive widgets from more diverse content providers.

There is thus a demand for a method by which a user can search for widgets provided by diverse content providers more easily.

SUMMARY

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method for providing widgets, in which widgets related to a certain keyword are searched for from among widgets provided by a plurality of content providers related to a certain keyword and the searched for widgets are classified and displayed according to content provider, and a TV using the same.

According to an aspect of the present invention, there is provided a method for providing widgets on a TV comprising searching for widgets related to a certain keyword among widgets provided by a plurality of content providers, and displaying the searched for widgets on a widget search list according to content provider.

The method may further comprise selecting at least one widget from the displayed widget search list, receiving a widget from a content provider corresponding to the selected widget, and displaying the received widget on a screen.

The displaying the received widgets may comprise, if two or more widgets are selected, displaying the two ore more selected widgets together.

The two or more selected widgets may display content on the same subject.

The method may further comprise displaying the content information received from the content providers on the widgets by using applications of the content providers corresponding to the selected widgets from among a plurality of applications corresponding respectively to the plurality of content providers.

The widget search list may be displayed with widget images searched for each item.

The keyword may be related to subjects of the widgets provided by the content providers.

The widgets provided by the plurality of content providers may include diverse types of widgets such as music widgets, video on demand (VOD) widgets, news widgets, weather widgets, stock widgets, map widgets, and web page widgets.

The certain keyword may be a keyword input or selected by a user or may be a preset keyword.

The widgets may be provided by Internet Protocol Television (IPTV) services.

According to another aspect of the present invention, there is provided a TV comprising an interface which receives widgets from a plurality of content providers, and a control unit which searches for widgets related to a certain keyword from among the widgets and controls the searched for widgets to be displayed on a widget search list according to content provider.

If at least one the control unit is selected from the displayed widget search list, the control unit may receive widgets from content providers corresponding to the selected widgets and control the received widgets to be displayed on a screen.

If two or more widgets are selected, the control unit may control the selected two or more widgets to be displayed together.

The selected two or more widgets may display content on the same subject.

The control unit may display content information received from the content providers on the widgets by using applications of the content providers corresponding to the selected widgets from among a plurality of applications corresponding respectively to the plurality of content providers.

The widget search list may be displayed with widget images searched for each item.

The keyword may be related to subjects of the widgets provided by the content providers.

The widgets may include at least one of image widgets, music widgets, VOD widgets, news widgets, weather widgets, stock widgets, map widgets, and web page widgets.

The certain keyword may be a keyword input or selected by a user or may be a preset keyword.

The widgets may be provided by Internet Protocol Television (IPTV) services.

BRIEF DESCRIPTION OF THE DRAWINGS

The above and/or other aspects of the present invention will be made more apparent by describing certain exemplary embodiments of the present invention with reference to the accompanying drawings, in which.

DETAILED DESCRIPTION OF EMBODIMENTS

Figure 1:
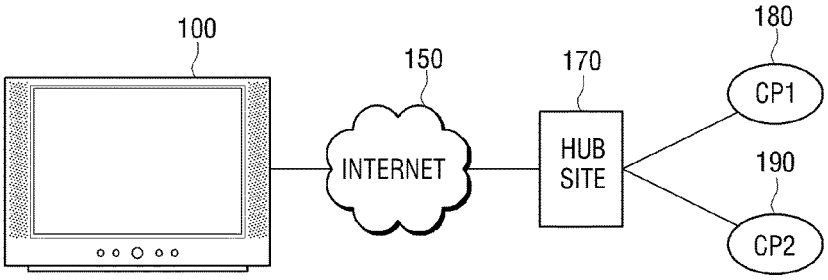
FIG. 1 is a diagram showing a TV content providing system according to an exemplary embodiment of the present invention.

Certain exemplary embodiments of the present invention will now be described in greater detail with reference to the accompanying drawings.

In the following description, same drawing reference numerals are used for the same elements even in different drawings. The matters defined in the description such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

FIG. 1 is a diagram showing a TV content providing system according to an exemplary embodiment of the present invention. As shown in FIG. 1, a TV content providing system includes a TV 100, an internet 150, a hub site 170, a content provider (CP) 1 and a CP2.

The TV 100 is connected to the hub site 170 through the internet 150. The TV 100 receives, in the forms of widgets, multimedia content such as moving pictures, music and the like from the hub site 170. The TV 100 also receives, in widget forms, data information content such as news, stock reports, weather information and the like from the hub site 170.

Here, a widget refers to a mini-item image on which content received by a content provider is displayed. The widget may be generated by the TV 100 based on the content received from a service provider. The widget may be generated by the service provider, and the TV 100 may receive the generated widget from the service provider and display the generated widget as it is.

The TV 100 sets a portion of a screen as a widget display region and the widget display region always has the widgets displayed thereon. The widgets, however, may be displayed on regions other than the widget display region.

The hub site 170 receives content from the CP1 180 and CP2 190. The hub site 170 manages the received content by forming databases, and transmits the content to the TV connected via the internet 150. The hub site 170 may receive the widgets from the CP1 180 and CP2 190, and may transmit the widgets to the TV 100.

Generally, the hub site 170 is a server that is operated by a manufacturer of the TV 100 so as to provide consumers who buy their TV with content services. The hub site 170 receives content from an external content provider. Alternately, the server may be operated by a third-party operator.

The CP1 180 and CP 2 190 are content providers which provide respective content to the hub site 170. For example, the CP1 180 may be Naver, and may provide weather forecast and stock reports to the hub site 170. The CP 2 190 may be You-Tube, and may provide multimedia content such as moving pictures, music and the like to the hub site 170. The CP1 180 and CP2 190 may provide the content in the form of widgets.

Any provider which provides content or widgets to the hub site 170 may take the role of the CP1 180 or CP2 190. The CP1 180 and CP2 190 may provide the content or the widgets directly to the TV 100, without the content passing through the hub site 170. Hereinafter, the used content provider refers to a general content provider which includes the CP1 180 and CP2 190.

Through the system described above, a user may receive various information and multimedia content from the hub site 4 using the TV.

Figure 2:
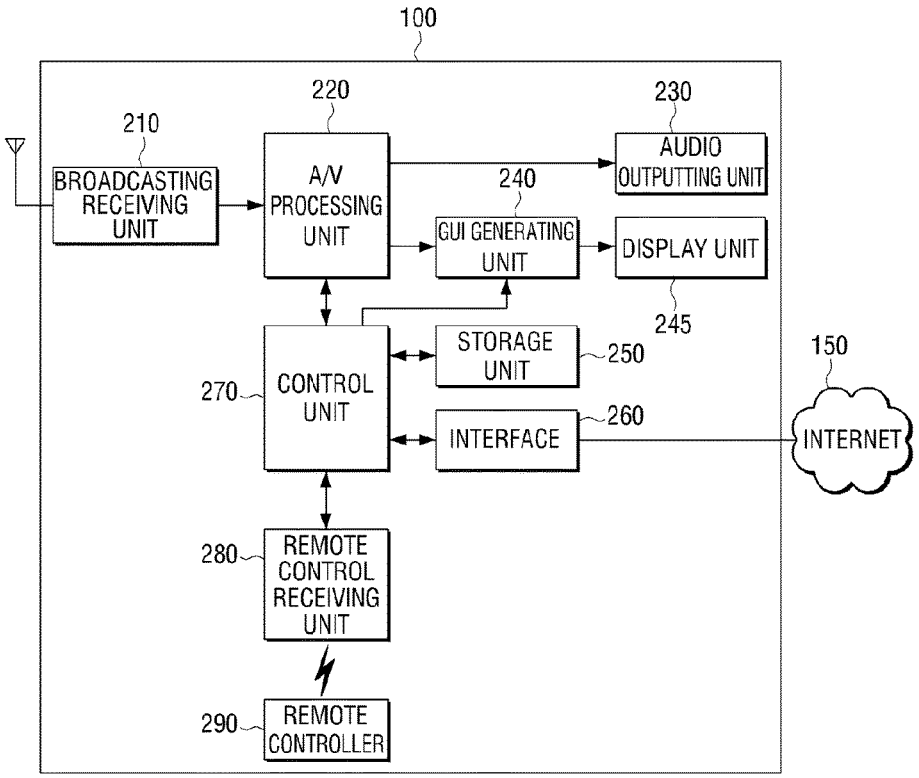
FIG. 2 is a block diagram showing a detailed configuration of a TV according to an exemplary embodiment of the present invention.

FIG. 2 is a block diagram showing a detailed configuration of a TV according to an exemplary embodiment of the present invention. Referring to FIG. 2, the TV 100 includes a broadcasting receiving unit 210, an A/V processing unit 220, an audio outputting unit 230, a GUI generating unit 240, a display unit 245, a storage unit 250, an interface unit 260, a control unit 270, a remote control receiving unit 280, and a remote controller 290.

The broadcasting receiving unit 210 receives and demodulates broadcasting by wire or wirelessly from a broadcasting station or a satellite. The broadcasting signal received by the broadcasting receiving unit 210 includes a data broadcasting signal. The data broadcasting signal includes news, weather forecast, stock reports and the like.

The A/V processing unit 220 performs signal processing, such as video decoding, video scaling, or audio decoding, on the image signal and the audio signal input from the broadcasting receiving unit 210 and the control unit 260. The A/V processing unit 220 generates the image signal to the GUI generating unit 240, and outputs the audio signal to the audio outputting unit 230.

When the received image and audio signals are stored in the storage unit 250, the A/V processing unit 220 outputs the image and audio in a compressed shape to the storage unit 250.

The audio outputting unit 230 outputs the audio output from the A/V processing unit 220 through a speaker.

The GUI generating unit 240 generates a Graphic User Interface (GUI) and provides the GUI to a use. The GUI generating unit 240 may generate a GUI including an on-screen display (OSD) menu and OSD items. The GUI generating unit 240 may generate a GUI for a widget search list which classifies the widgets searched for according to the content provider. The GUI generating unit 240 adds the generated GUI to the image output form the A/V processing unit 220.

Here, the widget search list refers to a list of the widgets searched for when a user searches for widgets using a certain keyword or based upon its relation to a certain program. That is, there may be widgets stored or on the web that are related to a certain program or a current program in which the viewer is currently viewing. The viewer may be able to search and select widgets that are related to a certain program. The widget search list will be described in detail later.

The display unit 245 displays the image output from the A/V processing unit 220. The display unit 245 may also display the image to which the widget search list generated by the GUI generating unit 240 is added, or the image to which the widget received using the interface 260 is added.

The storage unit 250 stores multimedia content or data information received by the broadcasting receiving unit 210. The storage unit 250 may also store multimedia content or data information received by the interface 260, or widget providing applications corresponding to a respective content provider. The storage unit 250 may be implemented as a hard disk, a non-volatile memory, or the like.

The interface 260 functions as a connection path which allows the TV 100 to communicate with the hub site 170. The interface 260 connects the TV 100 to the hub site 170 so that the TV 100 can communicate with the hub site 170 through a communication network such as an internet 150 or the like.

As the TV 100 is connected to the internet using the interface 260 as described above, the user may receive an Internet Protocol TV (IPTV) service. The IPTV service refers to a two-way television service provided using a high speed internet network. The IPTV is distinct from general cable broadcasting in that a viewer is able to view only the programs that he or she desires to view, at a time convenient to him or her. The IPTV may also provide services which provide widgets for displaying content such as news, weather forecast, stock reports, images, music and the like, in addition to the broadcasting program service.

The remote control receiving unit 280 receives a user command input using the remote controller 290 and transmits the user command to the control unit 270.

The control unit 270 determines the user command by the remote controller 290, and controls the entire operation of the TV 100 according to the user command.

The control unit 270 searches for content related to the certain keyword from the widgets on the web or among the widgets received using the interface 260, and controls a widget search list which classifies the searched widgets according to content provider to be displayed.

Here, the widget search list refers to a list displaying the widgets searched when the user searches for widgets using a certain keyword. The widget search list displays widgets searched for according to content provider, for a subject related to one or more keyword. The widget search list classifies the widgets of one subject according to content provider, so the user can select a widget of his or her desired content provider from among various content providers, using the widget search list.

When the widgets related to the certain keyword are searched, the control unit 270 controls the widget search list to be displayed in a form having widget images. If the widget search list including the widget images is displayed as described above, the user can visually determine the widgets provided according to content provider at a glance and select his or her desired widgets with ease.

When at least one widget is selected from the widget search list, the control unit 270 receives the widget from the content provider corresponding to the selected widget and controls the received widget to be displayed on a screen.

More specifically, if the widget search list is displayed, the user may select the widget corresponding to his or her desired content provider using the remote controller 290. If his or her desired widget is selected by the user, the control unit 270 controls the widget to be received from the content provider corresponding to the selected widget. The control unit 270 then controls the widget to be displayed, the widget being received from the selected content provider.

The widget receiving process may be specifically divided into a widget-related application receiving process and a content receiving process. The control unit 270 controls the widget-related application to be received from the selected content provider and to be installed on the TV 100. The widget-related application serves to generate the widget image of the content provider and display the received content using the widget. Thereafter, the TV receives the content information from the selected content provider, and the control unit 270 controls the content information received using the application to be displayed using the widget.

However, widgets may of course be received using various methods other than the method described above.

The control unit 270 thus displays the received content information on the widget using the application of the content provider corresponding to the selected widget from among a plurality of applications corresponding respectively to a plurality of content providers.

The widgets provided in the TV 100 are generally more conveniently provided from one content provider. The reason is that unless a single widget related application can be compatible with a plurality of content providers, a separate widget-related application may be needed corresponding to each content provider. If a plurality of applications corresponding to each of the content providers are incorporated or received and stored into the TV 100, the widgets of each content provider may be displayed on the screen. The TV 100 may thus display the widgets of the same subject received from the plurality of content providers together.

When there are two or more selected widgets, the control unit 270 controls the two or more selected widgets to be displayed together. Even though the two or more selected widgets display the same content, the two or more selected widgets are displayed together. As the widgets for the same content are displayed together, the user can use information on the same subject in diverse forms.

The keyword may be input directly by the user using the remote controller 290, or may be selected from among several keywords preset by the user. The keyword may also be preset by the user.

For example, when the user's desired keyword is "weather", the user may input "weather" directly using the remote controller 290 to check the widget search list related to the weather. The user may also check the widget search list related to the weather by selecting "weather" from among four keywords stored in the TV 100, such as "news", "weather", "stocks" and "VOD", using the remote controller 290. The user may also set the widget search list related to "weather" to be always displayed on the TV 100 by setting only the keyword "weather" to be used on the TV 100.

As described above, the TV 100 may receive widgets from various content providers and may provide the widgets.

Figure 3:
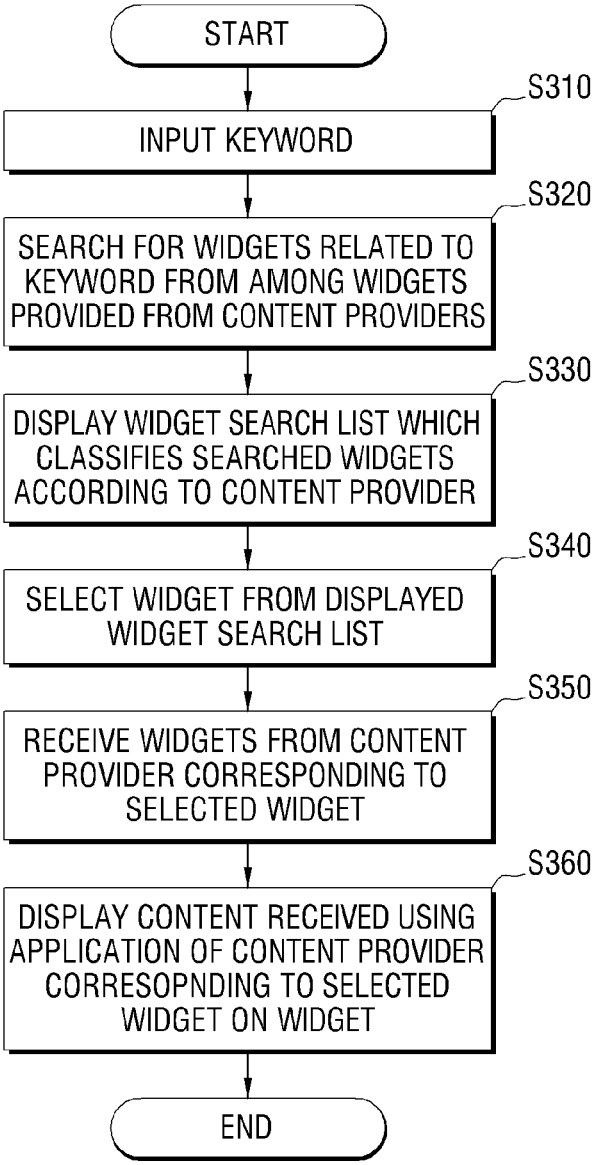
FIG. 3 is a flowchart explaining a method for providing widgets according to an exemplary embodiment of the present invention.

Hereinafter, a method for providing widgets will be described with reference to FIG. 3. FIG. 3 is a flowchart explaining a method for providing widgets according to an exemplary embodiment of the present invention.

First, a user inputs a keyword for his or her desired subject using a remote controller 290 in operation S310. The keyword may be input directly by the user using the remote controller 290, or may be selected from among preset several keywords by the user. The keyword may also be a keyword preset by the user.

The TV 100 searches for widgets related to the keyword from among the widgets provided from content providers in operation S320. The TV 100 displays a widget search list which classifies the widgets searched for according to content provider in operation S330.

The widget search list displays widgets searched for according to content provider, for the subject related to one keyword. The widget search list provides widgets of one subject according to content provider, so the user may select the widget of his or her desired content provider from among various content providers using the widget search list.

Figure 4:
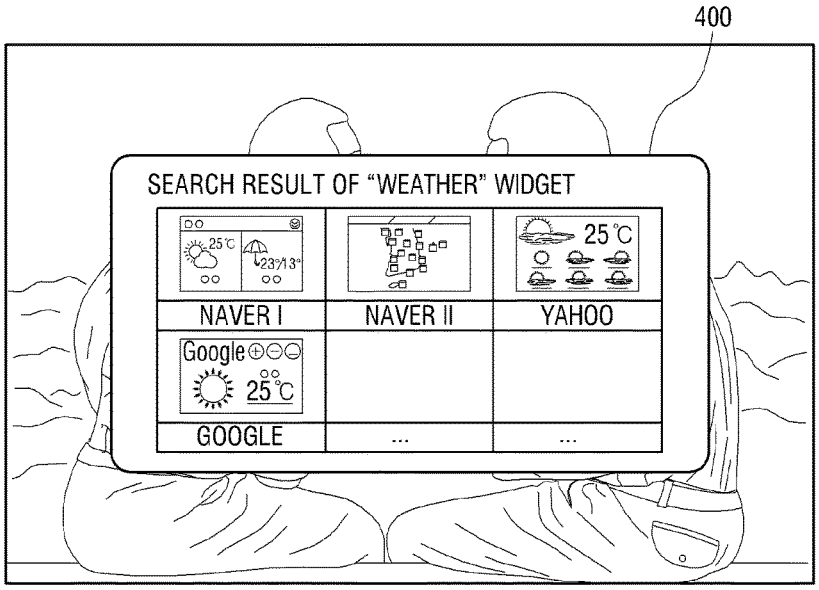
FIG. 4 is a diagram showing a screen on which a widget search list which classifies the searched widgets according to content provider is displayed, according to an exemplary embodiment of the present invention.

The widget search list will be described in detail with reference to FIG. 4. FIG. 4 is a diagram showing a screen on which a widget search list which classifies the widgets searched for according to content provider is displayed, according to an exemplary embodiment of the present invention.

As shown in FIG. 4, a widget search list 400 of the search result for weather widgets is displayed on the broadcasting screen of the TV 100. In other words, the user inputs the keyword "weather" and the weather widget search list 400 is displayed as the search result thereof.

Names of the content providers and widget images are displayed on each item of the widget search list 400. The names of the content providers are "Naver I", "Naver II", "Yahoo" and "Google", and the corresponding widget images are displayed in each widget image. In particular, the widgets of the same subject "weather" are displayed according to content provider.

As described above, as the widgets of the same subject are displayed on one widget search list 400, the user can use the widgets provided by various content providers more easily.

Returning to FIG. 3, the user selects at least one widget from the displayed widget search list in operation S340. The TV 100 receives the widget from the content provider corresponding to the selected widget in operation S350. The TV 100 displays the content received from the selected content provider on the widget using an application of the content provider corresponding to the selected widget in operation S360.

The user may also select two or more widgets from the widget search list. When two or more widget are selected, the TV 100 controls the two or more selected widgets to be displayed together. As described above, even though the two or more selected widgets display the content of the same subject, the two or more selected widgets are displayed together. As the widgets of the same subject are displayed together, the user can use information on the same subject in diverse forms.

The TV 100 may receive and display the widgets on the screen through the process described above.

Figure 5:
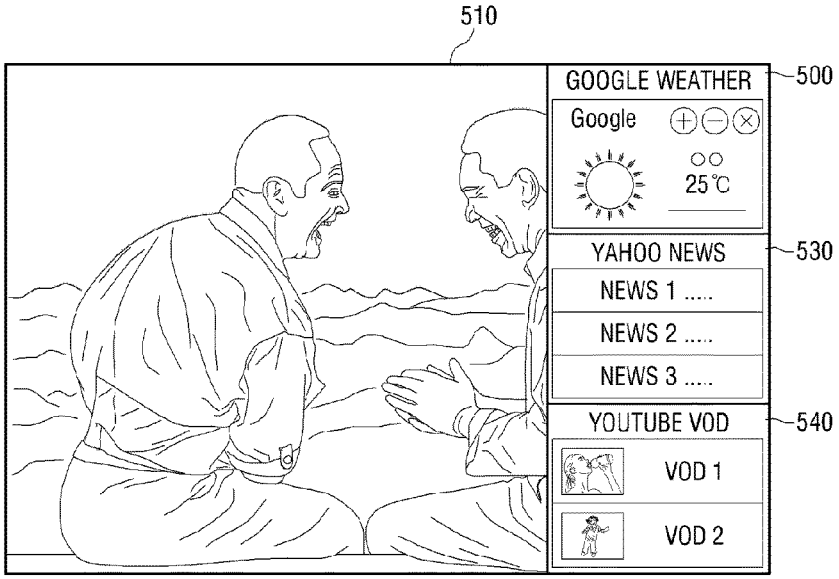
FIG. 5 is a diagram showing a screen on which a weather widget provided by Google service is displayed, according to an exemplary embodiment of the present invention.

The screen on which the widgets are displayed through the process described above will be described in detail with reference to FIGS. 5 to 7. FIG. 5 is a diagram showing a screen on which a weather widget provided by Google is displayed, according to an exemplary embodiment of the present invention.

As shown in FIG. 5, on the screen of the TV 100 a broadcasting screen 510 is displayed together with a Google weather widget 500, a Yahoo news widget 530, and a YouTube VOD widget 540. The widgets may be displayed on a right-hand side of the TV 100 so that watching the broadcasting screen 510 is not interrupted.

The widgets may be displayed in any position that does not interrupt the broadcasting screen 510. For example, any separate allocated region other than the broadcasting screen 510 region may also be set as a widget display region.

In FIG. 5, the user selects "Google" from among weather widgets, so the Google service weather widget is displayed.

At this time, when the user inputs a widget search command using a remote controller 290 and inputs the keyword "weather", the widget search list 400 of FIG. 4 is displayed on the screen.

When the user selects "Google" from the widget search list 400 of FIG. 4, the weather widget is changed as shown in FIG. 5. FIG. 5 is a diagram showing a screen on which, after a user selects a Google weather widget from a widget search list, a weather widget is changed into the Google weather widget, according to an exemplary embodiment of the present invention.

Figure 6:
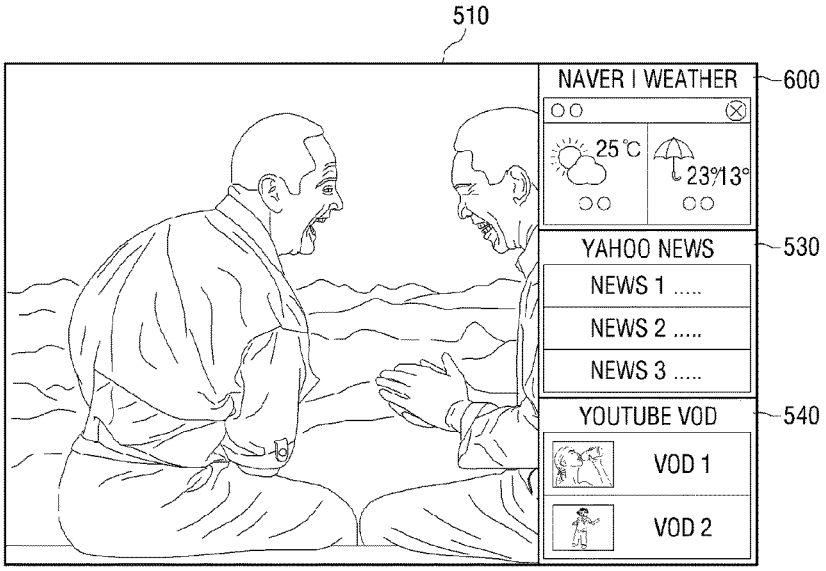
FIG. 6 is a diagram showing a screen on which, after a user selects a Naver service I weather widget from a widget search list, a weather widget is changed into the Naver service I weather widget, according to an exemplary embodiment of the present invention.

When the user selects a Naver I weather widget from the widget search list 400 of FIG. 4, the Naver I weather widget 600 is displayed as shown in FIG. 6.

In particular, the Naver I weather widget 600 of FIG. 6 has the same form as the weather widget displayed for Naver I in the widget search list 400 of FIG. 4.

As described above, the user can check the form of widgets searched at a glance using the widget search list 400, making it possible to select his or her desired widgets more easily.

The user may select two or more widgets from the widget search list 400 of FIG. 4. For example, when the user selects Google and Naver I from the widget search list 400, two weather widgets are displayed together as shown in FIG. 7. This feature will be described in detail with reference to FIG. 7.

Figure 7:
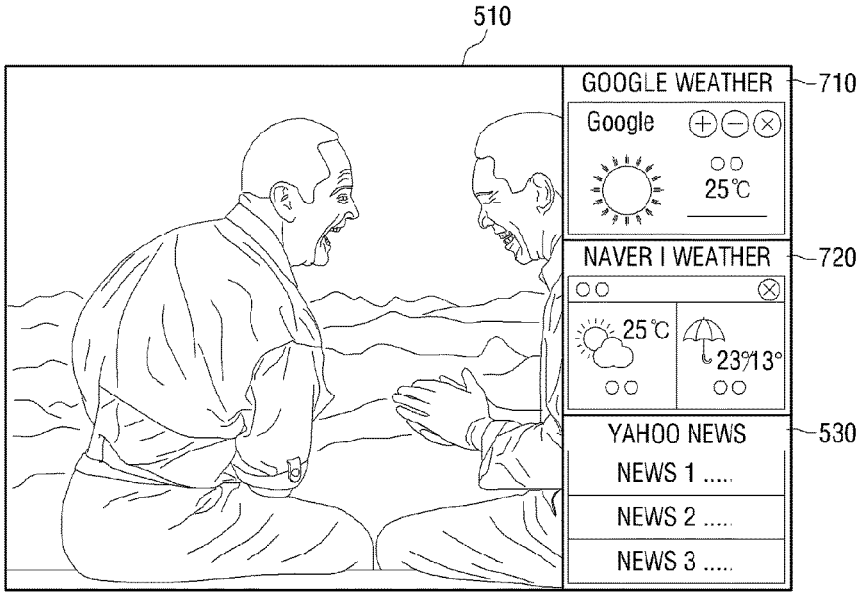
FIG. 7 is a diagram showing a screen on which selected widgets are displayed together, if a user selects a plurality of widgets, according to an exemplary embodiment of the present invention.

FIG. 7 is a diagram showing a screen on which selected widgets are displayed together, if a user selects a plurality of widgets, according to an exemplary embodiment of the present invention.

As shown in FIG. 7, Google weather widget 710 and Naver I weather widget 720 selected by the user are displayed together. A Yahoo news widget 530 is pushed down, and a YouTube VOD widget 540 has disappeared.

As described above, as two or more widgets of the same subject are displayed, the user can receive widgets of the same subject from various service providers and set the received widgets to be displayed on the screen.

In the present embodiment, the case in which the widget search list related to the keyword "weather" is displayed has been described, but any keywords may of course be applied to the widget search list. For example, stocks, maps, news, VOD, music, photos, or the like may be keywords, in addition to weather.

In other words, widgets may include photo widgets, music widgets, VOD widgets, news widgets, weather widgets, stocks widgets, map widgets, web-page widgets, and the like.

In the present embodiment, the widgets are described to be provided in a TV 100, but the widgets may of course be applied to any display apparatuses on which the widgets are displayed.

In the present embodiment, the TV 100 is described as receiving the widgets from the content providers CP1: 180 and CP2: 190, but the TV 100 may be implemented to receive the widgets from the content providers, passing through a Hub Site 170.

In the present embodiment a conventional television device was described, however any television receiving device such as an IPTV set-top may incorporate the present invention.

In the present embodiment the searching of the widgets was performed from a plurality of content providers; however the present invention may be implemented to perform search from a single content provider and thus, the list of the widgets may be from a single content provider.

As described above, the present invention provides a method for providing widgets in which widgets related to a certain keyword from among widgets provided from a plurality of content providers are searched and the searched widgets are classified according to the content provider and displayed, and a TV using the same, so a user can search for and use the widgets provided from various content providers more easily.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method for providing [dynamic content] *widget applications on a graphical user interface* in an electronic device, the method comprising:

receiving a search inquiry for searching *for* a plurality of [dynamic contents] *widget applications* provided by a plurality of content providers, wherein *each of the plurality of widget applications provides a widget image based on content information received from a corresponding content provider, and* at least one of the plurality of [dynamic contents] *widget applications* is user-interactive and automatically changes over time;

searching for [a dynamic content] *widget applications* related to the search inquiry *from* among the plurality of [dynamic contents] *widgets applications by searching one or more servers that provide the plurality of widget applications to the electronic device*; and displaying a search result in a [dynamic content] *widget* search list *on the graphical user interface of the electronic device*, the [dynamic content] *widget* search list including a plurality of searched [dynamic contents] *widget applications*, each searched [dynamic content] *widget application* being identified with [a] *the* corresponding content provider, wherein the [dynamic content] *widget* search list is divided into a plurality of areas, each area being associated with a corresponding one of the plurality of searched [dynamic contents] *widget applications*.

2. The method as claimed in claim 1, further comprising:

selecting [at least one dynamic content] *a widget application* from the displayed [dynamic content] *widget* search list;

receiving a [dynamic content] *widget application* from a content provider corresponding to the selected [dynamic content] *widget application*; and displaying the [received dynamic content] *widget application* on a screen *of the electronic device*.

3. The method as claimed in claim 2, wherein the displaying the [received dynamic content] *widget application* comprises, if two or more [dynamic contents] *widget applications* are selected, displaying *together* the two or more selected [dynamic contents together] *widget applications*.

4. The method as claimed in claim 3, wherein the two or more selected [dynamic contents] *widget applications* display content on a same subject.

5. The method as claimed in claim 2, further comprising:

displaying content information received from the content providers on the [dynamic contents] *electronic device* by using *the widget* applications of the content providers corresponding to the selected [dynamic contents from among a plurality of applications respectively corresponding to the plurality of content providers] *widget applications*.

6. The method as claimed in claim 2, wherein the [dynamic contents] *widget image* is displayed simultaneously with a television broadcast image.

7. The method as claimed in claim 6, wherein the [dynamic contents] *widget image* partially overlaps the television broadcast image.

8. The method as claimed in claim 1, wherein the [dynamic content] *widget* search list is displayed with [dynamic contents] images searched for each [item] *widget application*.

9. The method as claimed in claim 1, wherein the search inquiry is related to a subject of the [dynamic contents] *content information* provided by the plurality of content providers.

10. The method as claimed in claim 1, wherein the [dynamic contents] *widget applications* provided by the plurality of content providers include at least one of image [widgets] *widget applications*, music [widgets] *widget applications*, VOD [widgets] *widget applications*, news [widgets] *widget applications*, weather [widgets] *widget applications*, [stocks widgets] *stock widget applications*, map [widgets] *widget applications*, and web page [widgets] *widget applications*.

11. The method as claimed in claim 1, wherein the search inquiry is a keyword input [or] selected by a user or is a preset keyword.

12. The method as claimed in claim 1, wherein the [dynamic contents are] *plurality of widget applications is* provided by [IPTV] *Internet Protocol television* (*IPTV*) services.

13. The method as claimed in claim 1, wherein the [method] *electronic device* is incorporated in an Internet Protocol television (IPTV) set-top.

14. The method as claimed in claim 1, wherein the [method] *electronic device* is incorporated in a television.

15. The method as claimed in claim 1, wherein the [dynamic contents are] *widget image is* generated by the [television receiving] *electronic* device.

16. The method as claimed in claim 1, wherein the [dynamic contents are received from] *one or more servers are one or more of* the *plurality of* content [provider] *providers*.

17. The method as claimed in claim 1, wherein the searching [for the dynamic contents are] *is further* performed [from the] *by searching widget applications* stored [dynamic contents] in the electronic [receiving] device.

18. The method as claimed in claim 1, wherein the searching [for the dynamic contents] is performed [from the dynamic contents available] on the Internet.

19. The method as claimed in claim 1, wherein the [dynamic content] *widget* search list visually indicates an identification of the *corresponding* content provider for [the corresponding dynamic contents] *each widget application in the widget search list*.

20. The method as claimed in claim 1, wherein the search inquiry comprises a search text.

21. The method as claimed in claim 1, wherein the search inquiry is associated with a content being viewed by a user.

[22. The method as claimed in claim 1, wherein the dynamic content comprises a widget.]

23. The method as claimed in claim 1, further comprising:

receiving a user selection of at least [one dynamic content] *widget application* in the [dynamic content] *widget* search list; and displaying the at least one selected [dynamic content] *widget application* at a user defined area of a display screen of the electronic device.

24. The method as claimed in claim 23, wherein the [dynamic content] *widget image* is displayed in an area that does not interrupt a display of contents on the display screen of the electronic device.

25. An electronic [receiving] device, comprising:

a receiving unit which receives a search inquiry for searching *for* a plurality of [dynamic contents] *widget applications* provided by a plurality of content providers, wherein *each of the plurality of widget applications provides a widget image based on content information received from a corresponding content provider, and* at least one of the plurality of [dynamic contents] *widget applications* is user-interactive and automatically changes over time; and a control unit which [searches] *controls search* for a [dynamic content] *widget applications* related to the search inquiry from among the plurality of [dynamic contents] *widget applications by searching one or more servers that provide the plurality of widget applications to the electronic device* and [displays] *controls display of* a search result in a [dynamic content] *widget* search list *on a graphical user interface of the electronic device*, the [dynamic content] *widget* search list including a plurality of searched [dynamic contents] *widget applications*, each searched [dynamic content] *widget application* being identified with [a] *the* corresponding content provider, wherein the [dynamic content] *widget* search list is divided into a plurality of areas, each area being associated with a corresponding one of the plurality of searched [dynamic contents] *widget applications*.

26. The [television receiving] *electronic* device as claimed in claim 25, wherein if [at least one of the dynamic contents] *a widget application* is selected from the displayed [dynamic content] *widget* search list, the control unit [receives dynamic contents] *controls the receiving unit to receive the widget application* from *a* content [providers] *provider* corresponding to the selected [dynamic contents] *widget application* and [controls] *control* the [received dynamic contents] *widget application* to be displayed on a screen.

27. The [television receiving] *electronic* device as claimed in claim 26, wherein if two or more [dynamic contents] *widget applications* are selected, the control unit controls the two or more selected [dynamic contents] *widget applications* to be displayed together.

28. The [television receiving] *electronic* device as claimed in claim 27, wherein the two or more selected [dynamic contents] *widget applications* display content on a same subject.

29. The [television receiving] *electronic* device as claimed in claim 26, wherein the control unit [displays] *controls display of* content information received from the content providers on the [dynamic contents] *electronic device* by using *the widget* applications of the content providers corresponding to the selected [dynamic contents from among a plurality of applications respectively corresponding to the plurality of content providers] *widget applications*.

30. The [television receiving] *electronic* device as claimed in claim 25, wherein the [dynamic content] *widget* search list is displayed with [dynamic contents] images searched for each [item] *widget application*.

31. The [television receiving] *electronic* device as claimed in claim 25, wherein the search inquiry is related to [subjects] *a subject* of the [dynamic contents] *content information* provided by the plurality of content providers.

32. The [television receiving] *electronic* device as claimed in claim 25, wherein the [dynamic contents] *widget applications* include at least one of image [widgets] *widget applications*, music [widgets] *widget applications*, VOD [widgets] *widget applications*, news [widgets] *widget applications*, weather [widgets] *widget applications*, stock [widgets] *widget applications*, map [widgets] *widget applications*, and web page [widgets] *widget applications*.

33. The [television receiving] *electronic* device as claimed in claim 25, wherein the search inquiry is a keyword input by a user.

34. The [television receiving] *electronic* device as claimed in claim 25, wherein the [dynamic contents are] *plurality of widget applications is* provided by Internet Protocol television (IPTV) services.

35. The [television receiving] *electronic* device as claimed in claim 25, wherein the search inquiry is a keyword selected from a list provided by the control unit.

36. The [television receiving] *electronic* device as claimed in claim 25, wherein the search inquiry is a preset keyword provided by the control unit.

37. A method for providing [dynamic content] *widget applications on a graphical user interface* in an electronic [receiving] device, the method comprising:

receiving a search inquiry for searching *for* a plurality [dynamic contents] *of widget applications* provided by at least one content provider, wherein *each of the plurality of widget applications provides a widget image based on content information received from a corresponding content provider, and* at least one of the plurality of [dynamic contents] *widget applications* is user-interactive and automatically changes over time;

searching for [a dynamic content] *widget applications* related to the search inquiry [or a television program] *from* among the plurality of [dynamic contents] *widgets applications by searching one or more servers that provide the plurality of widget applications to the electronic device*; and displaying a search result in a [dynamic content] *widget* search list, the [dynamic content] *widget* search list including a plurality of searched [dynamic contents] *widget applications on the graphical user interface of the electronic device*, each searched [dynamic content] *widget application* being identified with [a] *the* corresponding content provider, wherein the [dynamic content] *widget* search list is divided into a plurality of areas, each area being associated with a corresponding one of the plurality of searched [dynamic contents] *widget applications*.

38. The method as claimed in claim 37, wherein the [method] *electronic device* is incorporated in an Internet Protocol television (IPTV) set-top.

39. The method as claimed in claim 37, wherein the [method] *electronic device* is incorporated in a television.

40. The method as claimed in claim 37, wherein the [dynamic contents are] *widget image is* generated by the electronic [receiving] device.

41. The method as claimed in claim 37, wherein the [dynamic contents are received from] *one or more servers are one or more of* the [at least one] *plurality of* content [provider] *providers*.

42. The method as claimed in claim 37, wherein the searching [for the dynamic contents] is *further* performed from [dynamic contents] *by searching widget applications* stored in the electronic [receiving] device.

43. The method as claimed in claim 37, wherein the searching [for the dynamic contents] is performed [from dynamic contents available] on the Internet.

44. The method as claimed in claim 37, wherein the [dynamic content] *widget* search list visually indicates an identification of the *corresponding* content provider for [the corresponding dynamic content] *each widget application in the widget search list*.

45. The method as claimed in claim 37, wherein the [dynamic content] *widget image* is [caused to be] displayed simultaneously with a television broadcast image.

46. The method as claimed in claim 37, wherein the [dynamic content] *widget image* partially overlaps a television broadcast image.

47. The method as claimed in claim 37, wherein the at least one content provider comprises a plurality of content providers, and wherein the searching [for the dynamic contents] is performed [from] *by searching* the plurality of content providers [and a resulting list of the dynamic contents is displayed, wherein dynamic contents in the displayed dynamic content search list are classified according to the plurality of the content providers] *as the one or more servers*.

*48. An electronic device, comprising:*

*a receiving unit configured to receive a search inquiry for searching for a plurality of widget applications provided by a plurality of widget providers, wherein each of the plurality of widget applications provides a widget image based on content information received from a corresponding widget provider; and*

*a control unit configured to control searching for widget applications related to the search inquiry from among the plurality of widget applications by searching one or more servers that provide the plurality of widget applications to the electronic device, process a search result related to the search inquiry, control display of the search result in a widget search list on a graphical user interface of the electronic device, the widget search list including a plurality of searched widget applications, each searched widget application in the displayed widget search list being visually identified with the corresponding widget provider and an image representing a corresponding widget application, and in response to a user input selecting a widget application in the widget search list, to control the receiving unit to receive data associated with the selected widget application to install the selected widget application in the electronic device,*

*wherein the widget applications are user-interactive and automatically change over time, and the widget search list is divided into a plurality of areas, each of the plurality of areas being associated with a corresponding one of the plurality of searched widget applications.*

*49. The device as claimed in claim 48, wherein the image representing a corresponding widget application represents a function of the corresponding widget application.*

*50. The device as claimed in claim 48, wherein the control unit is further configured to control the receiving unit to access a contents providing server and download content information from the contents providing server, and change at least one widget from among a plurality of widgets to correspond to the downloaded content information.*

*51. The device as claimed in claim 48, wherein the widget search list is in a table format.*

*52. The device as claimed in claim 48, wherein the control unit is further configured to control the receiving unit to receive securities information from a securities information providing server, and*

*provide a widget application corresponding to the received securities information.*

*53. The device as claimed in claim 48, wherein the control unit is further configured to control the receiving unit to receive weather information from a weather information providing server, and*

*provides a widget application corresponding to the received weather information.*

*54. A method for providing a widget application in a graphical user interface of an electronic device, the method comprising:*

*receiving a search inquiry for searching for a plurality widget applications provided by a plurality of widget providers, each of the plurality of widget applications provides a widget image based on content information received from a corresponding widget provider;*

*searching for widget applications related to the search inquiry from among the plurality of widget applications by searching one or more servers that provide the plurality of widget applications to the electronic device; and*

*generating and displaying a search result in a widget search list on the graphical user interface of the electronic device, the widget search list including a plurality of searched widget applications, each searched widget application being identified with the corresponding widget provider and an image representing a corresponding widget application,*

*wherein the widget applications are user-interactive and automatically change over time, and the widget search list is divided into a plurality of areas, each area being associated with a corresponding one of the plurality of searched widget applications.*

*55. The method as claimed in claim 54, wherein the image representing a corresponding widget application represents a function of the corresponding widget application.*

*56. The method as claimed in claim 54, wherein the widget search list is in a table format.*

*57. The method as claimed in claim 54, further comprising:*

*receiving securities information from a securities information providing server; and*

*providing a widget application corresponding to the received securities information.*

*58. The method as claimed in claim 54, further comprising:*

*receiving weather information from a weather information providing server; and*

*providing a widget application corresponding to the received weather information.*

* * * * *